United States Patent [19]
Heniges

[11] Patent Number: 5,178,038
[45] Date of Patent: Jan. 12, 1993

[54] CRANKSHAFT BALANCING MECHANISM FOR A VARIABLE COMPRESSION ENGINE

[76] Inventor: William B. Heniges, 3325 S.E. 120th Ave., Portland, Oreg. 97266

[21] Appl. No.: 826,614

[22] Filed: Jan. 28, 1992

[51] Int. Cl.⁵ .............................................. G05G 1/00
[52] U.S. Cl. .................................... 74/591; 123/78 F
[58] Field of Search ..................... 74/591, 600, 601; 123/78 F

[56] References Cited
U.S. PATENT DOCUMENTS
4,887,560 12/1989 Heniges .............................. 123/78 F

*Primary Examiner*—Dirk Wright
*Attorney, Agent, or Firm*—James D. Givnan, Jr.

[57] ABSTRACT

A crankpin on the crankshaft of a variable compression engine carries an eccentric bushing which is positionable about the crankpin axis to determine the length of piston stroke. To counteract the relocation of the bushing center of gravity counterweights are rotatably housed in a counterbalance of the crankshaft. Partial rotation of each counterweight shifts their centers of gravity with respect to the crankshaft axis of rotation to achieve crankshaft balancing. For positioning of the counterweights coincident with shifting of the eccentric bushing the same are shown coupled with gears. Positioning of the eccentric bushing to change piston stroke of the engine is by a motor responsive to a microprocessor and engine performance criteria.

6 Claims, 1 Drawing Sheet

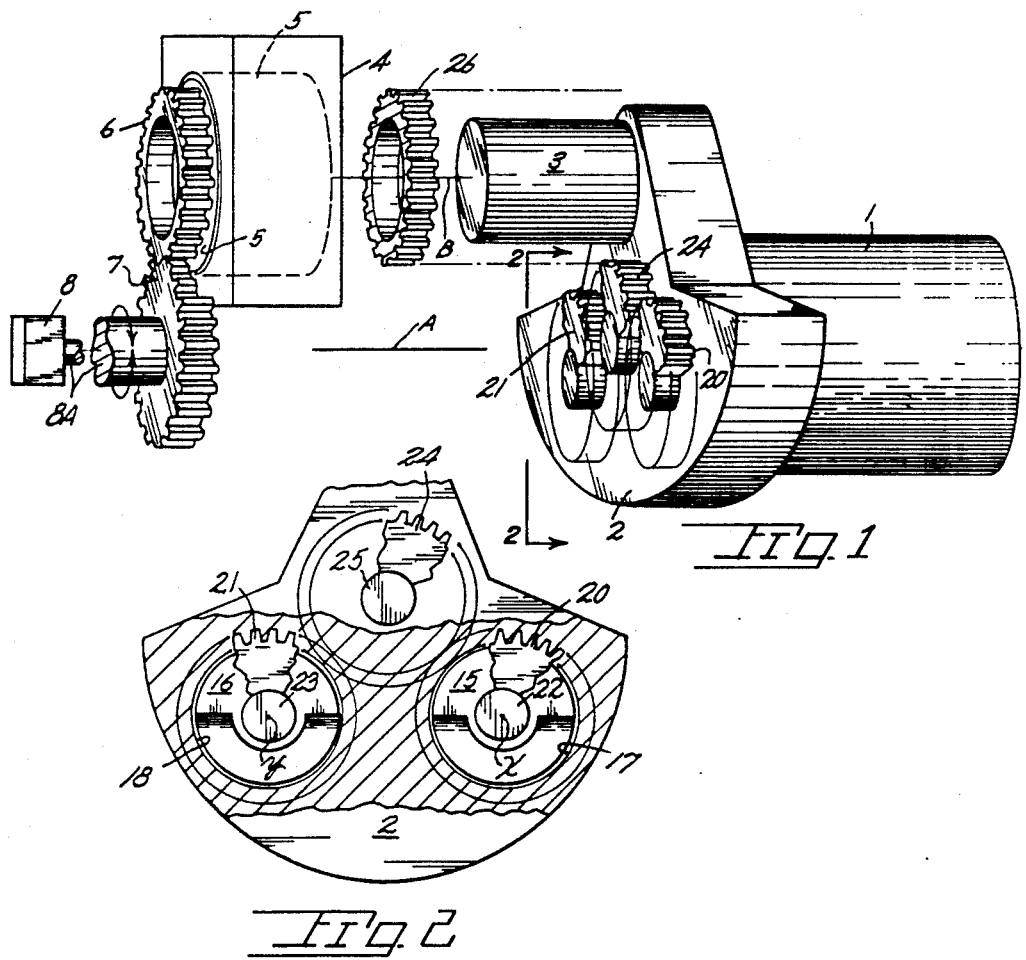
Fig. 1
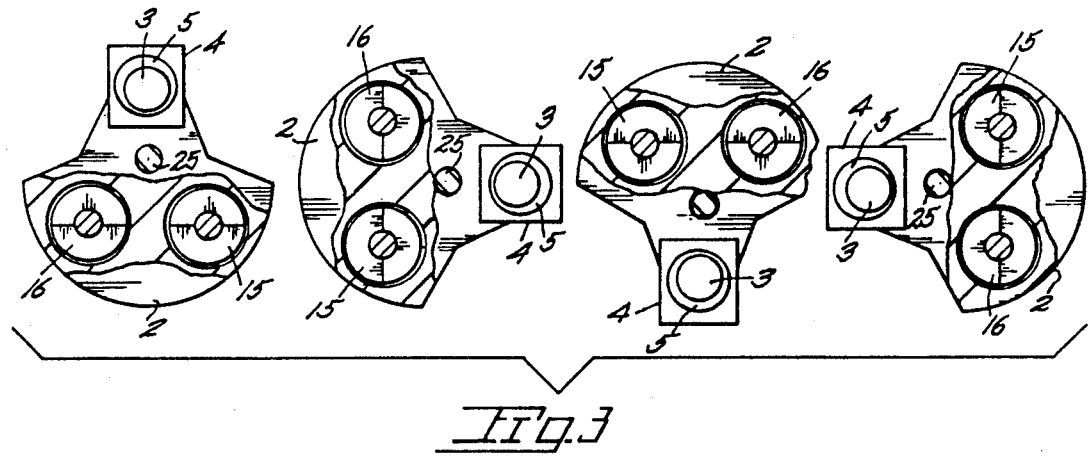
Fig. 2
Fig. 3

CRANKSHAFT BALANCING MECHANISM FOR A VARIABLE COMPRESSION ENGINE

BACKGROUND OF THE INVENTION

The present invention pertains to a mechanism for balancing an engine crankshaft of a variable stroke engine.

In engines such as the type shown and described in U.S. Pat. No. 4,887,460 provision is made for altering the throw of the crankpin of a crankshaft by the rotational positioning of an eccentric on the crankpin to ultimately determine or set piston stroke and effect a desired engine compression ratio. Upon such rotational positioning of the eccentric its center of gravity is shifted toward or away from the crankshaft axis of rotation.

SUMMARY OF THE PRESENT INVENTION

The present invention is embodied in an engine balancing mechanism wherein counterweight means are automatically positioned during piston stroke changes in a variable compression engine.

Counterweight means are carried by a crankshaft counterbalance with the counterweights (or counterweight) being settable about their respective axes during engine operation and specifically during the changing of an engine compression ratio of a variable compression engine. Rotation of a counterweight about its own axis serves to vary the distance of the counterweight center of gravity from the crankshaft axis of rotation to counterbalance a positionable eccentric bushing. The mechanism for rotationally positioning or setting of the counterweights operates simultaneously with the mechanism for varying piston stroke. In other words, as the eccentric bushing of the variable compression mechanism is shifted to alter piston stroke a gear train incrementally indexes the counterweights to shift the combined center of gravity to locate same diametrically opposed to the eccentric bushing center of gravity. The counterbalance of the engine crankshaft serves to carry the counterweights in a recessed positionable manner. Each counterweight is provided with a gear enmesh with a common gear which in turn is enmesh with a gear integral with the crankpin carried eccentric. As the compression regulating eccentric bushing is advanced or retarded about a crankshaft crankpin to vary engine compression ratio the counterweights are positioned to shift their centers of gravity with respect to the crankshaft axis of rotation. Where multiple counterweights are utilized their combined or effective center of gravity is diametrically opposed to the bushing center of gravity.

Important objectives of the present invention include the provision of an engine balancing mechanism for an engine of the variable compression type and particularly for such an engine that effects piston stroke changes by positioning of crankpin carried eccentric; the provision of an engine balancing system utilizing at least one counterweight rotatably housed on an engine counterbalance and having its center of gravity offset from its axis of rotation to permit incremental indexing of the counterweight to balance an engine crankshaft.

BRIEF DESCRIPTION OF THE DRAWINGS

In the drawings:

FIG. 1 is an exploded view of an engine crankshaft provided with the present invention;

FIG. 2 ia a front elevational view of the counterbalance of the crankshaft taken along line 2—2 of FIG. 1; and FIG. 3 is a schematic of the counterbalance with its counterweights set for balancing a crankshaft at a certain compression ratio at ninety degree increments of rotation.

DETAILED DESCRIPTION OF THE PREFERRED EMBODIMENTS

With continuing attention to the drawings the reference numeral 1 indicates a crankshaft journal provided with a counterbalance 2. A crankpin is at 3 offset from the crankshaft axis of rotation A.

A slider block at 4 is carried by crankpin 3 with an eccentric bushing 5 disposed intermediate crankpin 3 and slider block 4. A ring gear 6 is concentric with crankpin 3 and is integral with eccentric bushing 5. Indexing of ring gear 6 about an axis B of crankpin 3 will result in the eccentric bushing moving about the crankpin axis to vary the orbit of slider block 4 about crankshaft axis A. While a slider block is shown it is to be understood that in crankshafts for engines utilizing conventional crankpin, connecting rod and piston construction the slider block would be dispensed with and a bearing sleeve substituted therefor to receive a connecting rod bearing. The foregoing description is of those parts originally disclosed in U.S. Pat. No. 4,887,560 issued Dec. 19, 1989, to the present inventor and entitled Crankshaft Assembly For Variable Stroke Engine For Variable Compression. The above noted patent disclosure is incorporated herein by reference.

With attention now to the present invention. Indicated at 15 and 16 are circular counterweights carried by counterbalance 2 which is recessed to provide cavities at 17 and 18 to house the counterweights in a rotatable manner permitting same to be indexed in incremental fashion about their centers X and Y. The counterweights are each of a configuration resulting in their centers of gravity being offset from their axes of rotation at X and Y. For imparting indexing movement to each counterweight to relocate their centers of gravity, each is provided with a gear at 20 and 21 keyed to a counterweight carried stub shaft 22 and 23. Both gears 20-21 are jointly enmesh with a drive gear 24 carried by a spindle 25 on counterbalance 2. For imparting rotation to the above described gears, a ring gear at 26 is carried in place on an end wall of eccentric bushing 5. Gear 26 is concentric with crankpin 3. From the foregoing it will be understood that when eccentric bushing 5 is positioned about the crankpin, as later described, the ring gear 26 associated therewith will also move arcuately about crankpin axis B to drive gear 24 which, in turn, arcuately positions gears 20 and 21 and their counterweights. While dual counterweights are disclosed, in some crankshafts where adequate space exists, a single counterweight may be utilized.

For positioning eccentric bushing 5 to alter piston stroke and hence the compression ratio, ring gear 6 on eccentric bushing 5 is enmesh with a companion gear 7. Gear 7 may be advanced (accelerated) or retarded (decelerated) with respect to crankshaft rotational speed per the double ended arrows of FIG. 1. For driving companion gear 7 (normally at crankshaft speed) a servo motor 8 is provided with an output shaft 8A. Engine operation at a fixed comnpression ratio will occur when crankshaft speed and the speed of output shaft 8A are the same. For relocating the orbit of slider 4 (or a connecting rod bearing) to effect a change in engine piston stroke and hence engine compression ratio, servo motor 8 will accelerate or decelerate the speed of gear 7 to index eccentric bushing 5 within the slider. For example, shifting eccentric bushing 5 180 degrees from the FIG. 1 position will cause the orbital path of slider 4 to move outward or away from crankshaft axis A to increase piston stroke. The speed of servo motor 8 would be controlled by a computer or microprocessor responsive to selected engine parameters. The above mentioned earlier patent issued to the present inventor disclosed a parallelogram gear linkage for accomplishing arcuate positioning of an eccentric bushing in an engine.

FIG. 3 shows the engine crankshaft at 90 degree increments through one revolution with engine operation being at a fixed compression ratio. During one crankshaft revolution during the making of a change in engine compression ratio, the counterweights 15-16 would shift arcuately about their axes X and Y to relocate their effective center of gravity to balance the simultaneously shifting center of gravity of eccentric bushing 5.

While I have shown but one embodiment of the invention, it will be apparent to those skilled in the art that the invention may be embodied still otherwise without departing from the spirit and scope of the invention.

Having thus described the invention, what is claimed and desired to be secured by a Letters Patent is:

1. A crankshaft with a counterbalance and a crankpin for use in a variable compression engine having pistons, the improvement comprising, an eccentric bushing on said crankpin, means imparting arcuate rotation to said eccentric bushing to position same about said crankpin to vary the orbital path of the bushing about the crankshaft axis of rotation, means carried by said eccentric bushing to impart reciprocal movement to the pistons, at least one counterweight journalled on said counterbalance for positioning about its axis of rotation and having its center of gravity offset from its axis of rotation whereby its center of gravity is positionable with respect to the crankshaft axis of rotation to balance the crankshaft through a range of eccentric bushing positions, and means coupling said eccentric bushing to said counterweight to position same about its axis to vary the counterweight center of gravity from the crankshaft axis simultaneously with the altering of the orbital path of the eccentric bushing during the changing of the engine compression ratio.

2. The improvement claimed in claim 1 wherein said means coupling said eccentric bushing to said counterweight includes drive means acting on said counterweight to position same simultaneously with positioning of its bushing.

3. The improvement claimed in claim 2 wherein said drive means includes a gear train.

4. The improvement claimed in claim 1 wherein said counterbalance defines a cavity to receive said counterweight.

5. The improvement claimed in claim 4 wherein said counterweight is journalled in said cavity in said counterbalance.

6. The improvement claimed in claim 1 wherein said eccentric bushing on said crankpin includes a gear, a companion gear enmesh with said gear, a variable speed servo motor responsive to a microprocessor receiving signals generated by engine monitors, said motor operable to position said companion gear and the first mentioned gear to position said eccentric bushing about the axis of said crankpin and hence vary the orbital path of the eccentric bushing about the crankshaft axis of rotation.

* * * * *